United States Patent [19]

Marrero

[11] Patent Number: 5,786,990
[45] Date of Patent: *Jul. 28, 1998

[54] IMPLEMENTATION OF RIPPLE STEERING TO CONVERTER TOPOLOGIES

[75] Inventor: Joseph Marrero, Menlo Park, Calif.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 722,812

[22] Filed: Sep. 27, 1996

[51] Int. Cl.$^6$ ............................ H02J 1/00; H02M 1/12; H02M 7/537; H02M 3/336
[52] U.S. Cl. .................. 363/16; 363/40; 363/131; 363/17; 363/26
[58] Field of Search ................... 363/15, 16, 39, 363/40, 131, 17, 26

[56] References Cited

U.S. PATENT DOCUMENTS

| | | | |
|---|---|---|---|
| 3,106,672 | 10/1963 | Mills | 320/1 |
| 4,253,139 | 2/1981 | Weiss | 363/40 |
| 4,618,919 | 10/1986 | Martin, Jr. | 363/16 |
| 4,692,851 | 9/1987 | Attwood | 363/16 |
| 4,768,141 | 8/1988 | Hubertus et al. | 363/16 |
| 5,038,263 | 8/1991 | Marrero et al. | 363/20 |
| 5,047,911 | 9/1991 | Sperzel et al. | 363/16 |
| 5,107,151 | 4/1992 | Cambier | 363/16 |
| 5,224,025 | 6/1993 | Divan et al. | 363/16 |
| 5,345,375 | 9/1994 | Mohan | 363/40 |
| 5,619,404 | 4/1997 | Zak | 363/16 |

*Primary Examiner*—Peter S. Wong
*Assistant Examiner*—Bao Q. Vu
*Attorney, Agent, or Firm*—Limbach & Limbach L.L.P.

[57] ABSTRACT

A voltage converter whose output voltage is determined by the duty cycle of at least one switch and which includes ripple steering circuitry, and a current source whose output current is determined by the duty cycle of at least one switch and which includes ripple steering circuitry. In some embodiments, the voltage converter includes at least one yoked switch pair, circuitry for controlling the duty cycle of the yoked switch pair, and ripple steering circuitry. Preferably, the voltage converter includes a transformer, an input side, an output side, and ripple steering circuitry implemented on the input side. Examples of voltage converters in the first class are forward converters, flyback converters, and full bridge forward converters. In other embodiments, the invention is a half bridge voltage converter, which includes a transformer, an input side, an output side, a first branch on the input side (including a first switch, at least a first capacitor, and a primary winding of the transformer), a second branch on the input side (including a second switch, at least a second capacitor, and the primary winding of the transformer), control circuitry for controlling the duty cycle of each of the switches, and ripple steering circuitry on the input side. In other embodiments, the invention is a SEPIC voltage converter including a transformer, an input side, an output side, a switch on the input side, control circuitry for controlling the duty cycle of the switch, and ripple steering circuitry on both the input side and the output side.

27 Claims, 8 Drawing Sheets

IMPLEMENTATION OF RIPPLE STEERING TO CONVERTER TOPOLOGIES

FIELD OF THE INVENTION

The present invention relates to voltage conversion (or current source) circuitry of a type wherein the output voltage (or current) is determined by the duty cycle of at least one switch which receives a voltage related to the input voltage. More particularly, the invention relates to voltage conversion (or current source) circuitry of this type which implements ripple steering.

BACKGROUND OF THE INVENTION

Ripple steering has been implemented in a variety of circuits, some of which are described in U.S. Pat. No. 5,038,263, issued on Aug. 6, 1991, to Joseph Marrero and Christopher Peng. For example, U.S. Pat. No. 5,038,263 discloses several types of voltage conversion circuits which implement ripple steering, including a forward converter (see FIGS. 6 and 7 of U.S. Pat. No. 5,038,263), a fly-back converter (see FIGS. 10–12 of U.S. Pat. No. 5,038,263), and a push-pull converter (see FIG. 15 of U.S. Pat. No. 5,038, 263).

However, it would be desirable to reduce the cost of implementing controllable voltage conversion circuits (which implement ripple steering) by using less expensive switches (i.e., transistors). The present invention provides such an improved voltage conversion circuit, in which each switch operates with lower maximum voltage applied across it than the maximum voltage applied across switches in conventional voltage conversion circuits designed to produce the same output voltage in response to the same input voltage.

It would also be desirable to design a voltage converter which can be controlled to generate (in response to an input voltage) any selected one of a wide range of output voltages (including output voltages greater than and less than the input voltage), and which implements ripple steering.

However, it had not been known (with certain topologies) until the present invention how to achieve the objectives noted in the two preceding paragraphs.

A type of voltage converter known as a SEPIC converter is widely used in power factor correction. A major problem with use of this type of circuit is that the average input current must be sensed, but a SEPIC converter has a large pulsed input current, in a discontinuous conduction mode. Hence a SEPIC converter must extract an average current from this large pulsed current, which creates a lot of complexity in its design. Implementation of ripple steering in a SEPIC converter (in accordance with the present invention) will result in the input current being the average value, which will significantly simplify the circuit design of the SEPIC converter.

SUMMARY OF THE INVENTION

In a first class of embodiments, the invention is a controllable voltage converter whose output voltage is determined by controlling the duty cycle of one or more pairs of switches, wherein the voltage converter includes at least one yoked switch pair, circuitry for controlling the duty cycle of the yoked switch pair (thereby controlling the output voltage), and ripple steering circuitry. Preferably, the voltage converter includes a transformer, an input side which drives the primary side of the transformer, an output side which is driven by the secondary side of the transformer, and ripple steering circuitry implemented on the input side ("input-side ripple steering circuitry"). Optionally, ripple steering circuitry implemented on the output side, or ripple steering circuitry is implemented on the input side and additional ripple steering circuitry is implemented on the output side. Also preferably, each yoked switch pair is a pair of transistors, and at least a first pair of transistors is connected on the input side such that current flows through one of the transistors to the primary side of the transformer and then through the other of the transistors when both transistors of the first pair are on, and wherein the input-side ripple steering circuitry provides a path for current flow when both transistors of the first pair are off, so that the input current of the converter will be continuous rather than pulsating.

Examples of voltage converters in the first class of embodiments are two-switch forward converters, two-switch flyback converters, and full bridge forward converters.

In a second class of embodiments, the invention is a half bridge voltage converter for asserting a controllable output voltage in response to an input voltage. The converter includes a transformer, an input side which drives the primary side of the transformer, an output side which is driven by the secondary side of the transformer, a first branch on the input side (including a first switch, at least a first capacitor, and a primary winding of the transformer), a second branch on the input side (including a second switch, at least a second capacitor, and the primary winding of the transformer), control circuitry for controlling the duty cycle of each of the switches (thereby controlling the output voltage), and ripple steering circuitry on the input side. When the first switch is closed and the second switch is open, current flows through the first branch but not the second branch, and when the first switch is open and the second switch is closed, current flows through the second branch but not the first branch. The ripple steering circuitry provides a path for current flow when both switches are open. Optionally, additional ripple steering circuitry is implemented on the output side. Preferably, each switch is a transistor.

In a third class of embodiments, the invention is a SEPIC voltage converter for asserting a controllable output voltage in response to an input voltage. The converter includes two inductors, an input side which develops a voltage across an internal capacitor, an output side which is driven by both inductors, a switch on the input side, control circuitry for controlling the duty cycle of the switch (thereby controlling the output voltage), ripple steering circuitry on the input side, and additional ripple steering circuitry on the output side. Preferably, the switch is a transistor. Also preferably, the input side is electrically isolated from the output side.

In other embodiments, the invention is a controllable current source whose output current is determined by controlling the duty cycle of one or more pairs of switches, wherein the current source includes at least one yoked switch pair, circuitry for controlling the duty cycle of the yoked switch pair (thereby controlling the output current), and ripple steering circuitry. Preferably, the current source includes a transformer, an input side which drives the primary side of the transformer, an output side which is driven by the secondary side of the transformer, and ripple steering circuitry implemented on the input side. Optionally, ripple steering circuitry implemented on the output side, or ripple steering circuitry is implemented on the input side and additional ripple steering circuitry is implemented on the output side.

DETAILED DESCRIPTION OF THE PREFERRED EMBODIMENT

Figure 1:
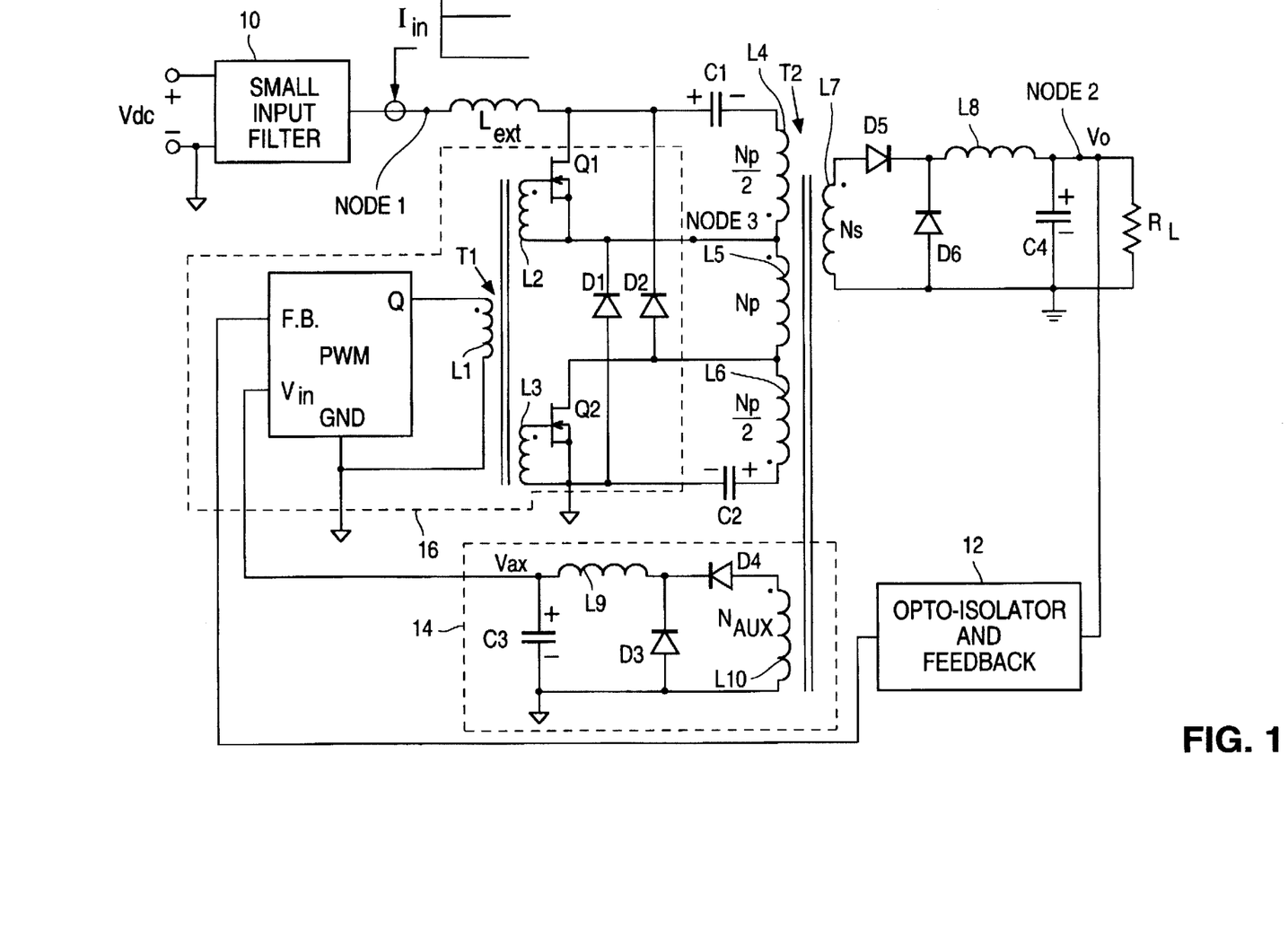
FIG. 1 is a schematic diagram of a dual switch forward converter which embodies the invention.
Figure 3:
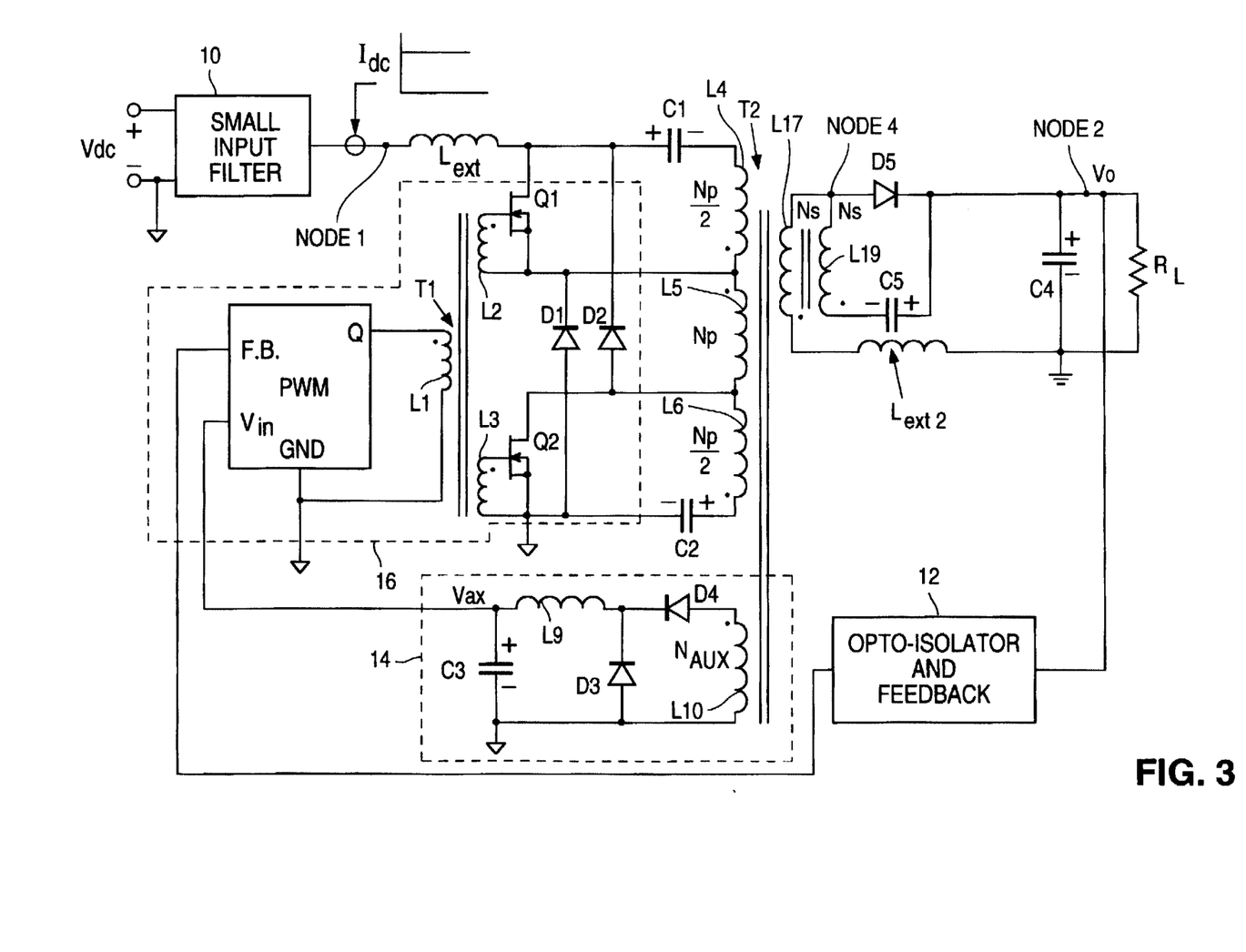
FIG. 3 is a schematic diagram of a flyback converter according to a second embodiment of the invention.
Figure 4:
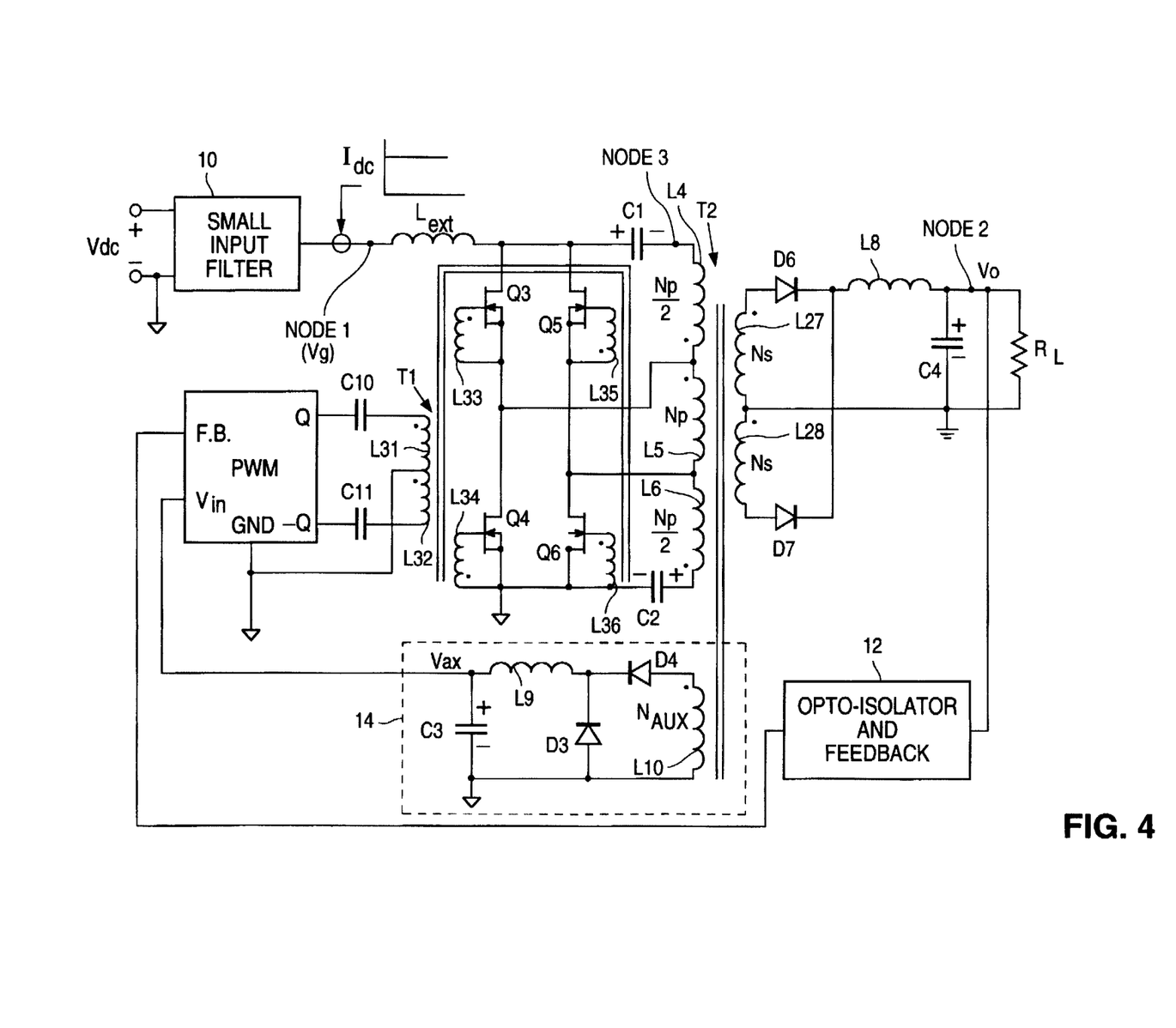
FIG. 4 is a schematic diagram of a full bridge forward converter according to a third embodiment of the invention.

Each of the embodiments of FIGS. 1, 3, and 4, includes at least one "yoked" switch pair. The switches in each such pair are "yoked" in the sense that both switches are controlled so as to be "open" simultaneously or "closed" simultaneously. For example, transistors Q1 and Q2 of FIG. 1 (or FIG. 3) are a yoked pair of switches, and transistors Q3 and Q6 of FIG. 4 are a yoked pair of switches.

Figure 2:
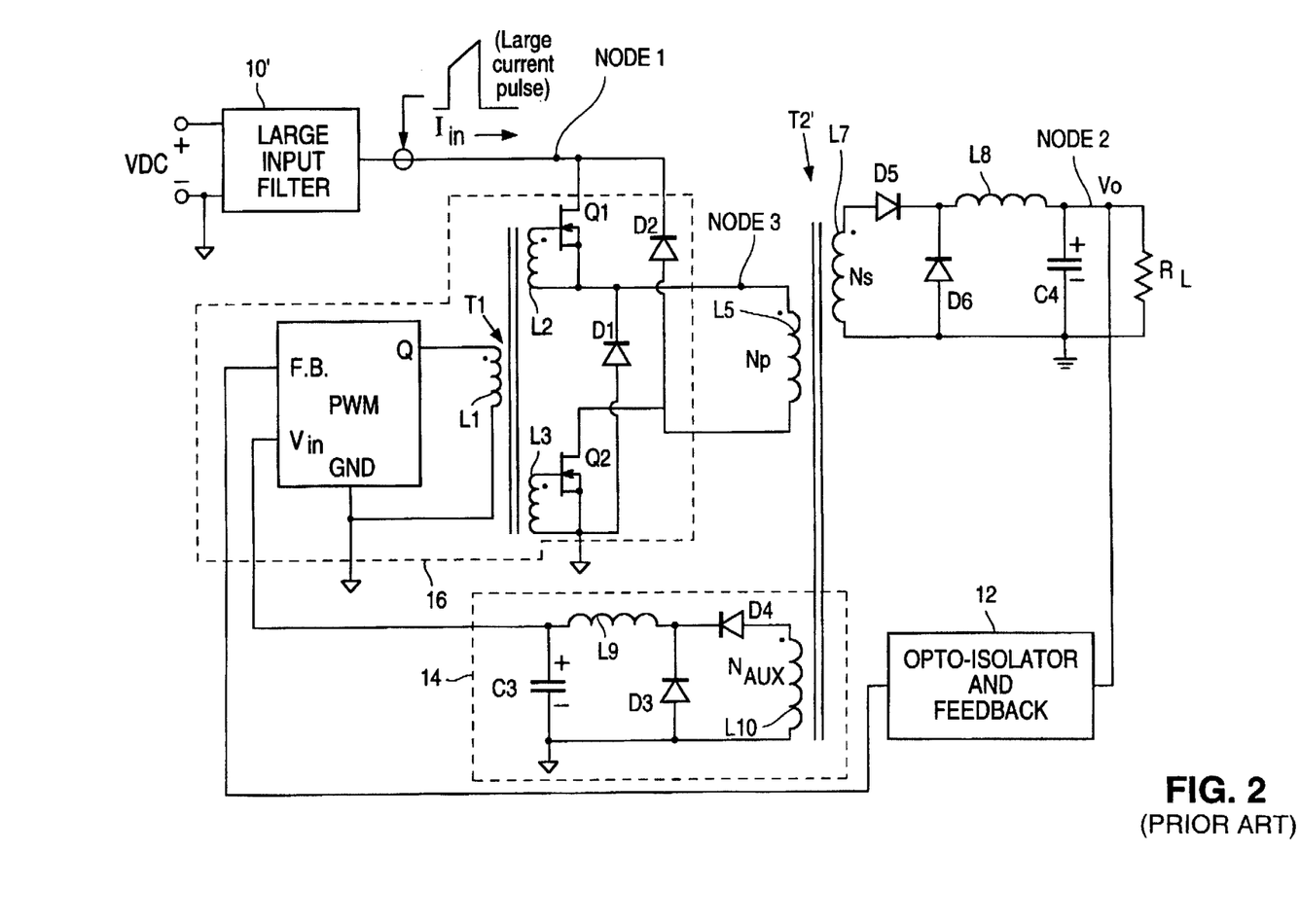
FIG. 2 is a schematic diagram of a two-transistor forward converter which does not include circuitry implementing ripple steering.

In preferred embodiments, the present invention is a forward converter which includes dual switches and circuitry implementing ripple steering. An example of such a preferred embodiment is the forward converter of FIG. 1. For purposes of comparison, FIG. 2 is a dual switch (two-transistor) forward converter which does not include ripple steering circuitry and which thus does not embody the invention.

The function of the forward converter of FIG. 1 (and the forward converter of FIG. 2) is to convert input voltage Vdc to output voltage Vo. In both circuits, the output voltage Vo is typically applied across a load which is represented by load resistance $R_L$. The ratio of output voltage Vo to input voltage Vdc is controllable by varying the duty cycle of switches Q1 and Q2 within control circuit 16. Switches Q1 and Q2 are controlled so that both always have the same state ("on" or "off"). A forward converter is a well known type of voltage conversion circuit, and since its structure and function are well known, they need not be described in detail herein. The following description will focus on the inventive improvements to conventional forward conversion circuit design.

The FIG. 1 circuit includes input filter 10, control circuit 16, transformer T2 (whose primary windings are L4, L5, and L6 and whose secondary windings are winding L7 and winding L10), inductor $L_{ext}$ and capacitors C1 and C2 (connected in series with filter 10 and windings L4, L5, and L6 as shown), auxiliary voltage source 14 (for supplying voltage $V_{ax}$ needed for operation of pulse width modulation circuit PWM within control circuit 16), an output circuit comprising diodes D5 and D6, inductor L8, and capacitor C4 (connected between the secondary winding of transformer T2 and load $R_L$ as shown), opto-coupler and feedback circuit 12 (for generating a feedback signal indicative of the instantaneous output voltage Vo, and supplying such feedback signal through an opto-coupler to pulse width modulation circuit PWM for use by circuit PWM in generating a control voltage for controlling the duty cycle of switches Q1 and Q2). Each of windings L4 and L6 is wound with polarity opposite to that of winding L5, and winding L5 has Np turns while each of L4 and L6 has Np/2 turns (as indicated in FIG. 1). Control circuit 16 includes pulse width modulation circuit PWM, switches Q1 and Q2 (each of which is an NMOS transistor), transformer T1 whose primary winding consists of L1 and whose secondary windings are L2 and L3, and diodes D1 and D2, connected as shown in FIG. 1. Also included in typical implementations of the FIG. 1 converter (but not shown in FIG. 1) is a start-up circuit which supplies an initial start-up voltage to terminal "$V_{in}$" of pulse width modulator PWM during an initial operation period (from commencement of operation of the FIG. 1 circuit until auxiliary voltage source 14 develops voltage $V_{ax}$). Following the initial operation period, voltage $V_{ax}$ is supplied to terminal "$V_{in}$" of pulse width modulator PWM, in place of the start-up voltage.

Pulse width modulator PWM asserts a square wave voltage at output terminal "Q" (connected to winding L1) which either has a high level or a low level. PWM causes this voltage to undergo a transition of a first type (high-to-low or low-to-high) periodically (with period T), and to undergo a transition of the opposite type (low-to-high or high-to-low) at a controllable moment between consecutive transitions of the first type.

NMOS transistors Q1 and Q2 are controlled by pulse width modulator PWM so that both are "on" simultaneously (with current flowing between the source and drain of each) or "off" simultaneously (with no significant current flow between the source and drain of each). The duty cycle determines the ratio of output voltage Vo asserted by the FIG. 1 circuit to the input voltage Vdc to the FIG. 1 circuit:

$$Vo/Vdc=kD=k(To/T),$$

where k=M(Ns/Np), M is the efficiency of the converter, D is the duty cycle (To/T) of switches Q1 and Q2, T is the period defined in the previous paragraph, To is the "on" portion of each period T (during which switches Q1 and Q2 are on). Subsequently in this disclosure, with reference to all embodiments (including that of FIG. 1) it will be assumed for simplicity that M=100%, but it will be appreciated by those of ordinary skill how to modify the specified relations between input and output voltages to account for the case that M is less than 100%.

With reference again to FIG. 1, during normal operation, period T is fixed but time To varies (in response to the feedback voltage supplied to PWM from circuit 12) to maintain output voltage Vo as nearly constant as possible.

Circuit PWM controls transistors Q1 and Q2 as follows: the voltage at output terminal "Q" of circuit PWM (and thus the potential difference across primary winding L1 of transformer T1) is either high (causing secondary windings L2 and L3 of transformer T1 to hold the control gates of NMOS transistors Q1 and Q2 at a sufficiently high potential to turn on transistors Q1 and Q2), or low (causing secondary windings L2 and L3 of transformer T1 to hold the control gates of NMOS transistors Q1 and Q2 at a sufficiently low potential to turn off transistors Q1 and Q2).

Auxiliary voltage source 14 supplies voltage $V_{ax}$ (needed for operation of pulse width modulator PWM) to terminal "$V_{in}$" of pulse width modulator PWM. Source 14 includes winding L10 (which is wound as a secondary winding of transformer T2, and has $N_{aux}$ turns), and diodes D3 and D4, inductor L9, and capacitor C3 connected as shown to make a low pass filter. During typical operation (with both input voltage Vdc and output voltage Vo being substantially constant), voltage $V_{ax}$ will also be substantially constant, with its amplitude determined by the turns ratio multiplied by (To/T)(Vdc):

$$(Np/N_{aux}) (To/T) (Vdc).$$

The output side of the FIG. 1 circuit (comprising diodes D5 and D6, inductor L8, and capacitor C4) functions as a low pass filter and rectifies the square wave voltage across secondary winding L7 of transformer T2, and thereby asserts output voltage Vo across the load $R_L$, which is the average value of the square wave.

Circuit PWM includes control signal generation circuitry (which can be of a conventional type) for generating a control voltage in response to the feedback signal (indicative of instantaneous output voltage Vo) supplied from optocoupler and feedback circuit 12 to the "F.B." terminal of circuit PWM. Circuit 12 optically isolates the control voltage generation circuitry of circuit PWM from Node 2 and output ground (while allowing the control voltage generation circuitry to operate in the manner to be described).

The control voltage generated by the control voltage generation circuitry within circuit 12 determines the time (between consecutive transitions of the above-defined "first type") at which circuit PWM asserts a transition of the other type at its output terminal Q (optionally, the control voltage determines the time at which circuit PWM asserts transitions of both types at terminal Q). Thus, the control voltage determines the duty cycle of switches Q1 and Q2. The control voltage generation circuitry within circuit PWM implements negative feedback in the following sense: when output voltage Vo rises above its desired level, it varies the control voltage to cause a reduction in the duty cycle of switches Q1 and Q2 (thus reducing the output voltage); and when output voltage Vo falls below its desired level, it varies the control voltage to cause an increase in the duty cycle of switches Q1 and Q2.

Although the FIG. 1 circuit could be redesigned with a single transistor switch which replaces transistor pair Q1 and Q2, such a single transistor would need to have a capacity to operate with twice the voltage across it (e.g., across its source and drain) than the voltage over which transistor Q1 (or Q2) must operate. Specifically, where $V_g$ is the voltage at Node 1, each of transistors Q1 and Q2 must operate with a voltage in the range from zero volts to about $V_g$ across its source and drain, while a single transistor which replaces pair Q1,Q2 would need to operate with a voltage in the wider range from zero to about $2V_g$ across its source and drain. Typically, it is less expensive to implement a voltage converter with two low capacity switches (such as Q1 and Q2) than with a single switch having twice the capacity of either low capacity switch, and the two switches (Q1 and Q2) will be able to deliver much more power to the load $R_L$.

The FIG. 1 circuit includes the following components which implement ripple steering: inductor $L_{ext}$, capacitors C1 and C2, and steering windings L4 and L6, connected as shown in FIG. 1. These components provide a continuity of current (average DC current) when switches Q1 and Q2 are off, thereby reducing the large pulsating current which produces many frequency components across voltage $V_g$ (time varying frequency components having period T, and higher frequency harmonics thereof) at Node 1 during operation. As a result, voltage source $V_g$ at Node 1 will have less harmonic distortion, known as conducted EMI. Node 1 is substantially a DC voltage (assuming Vdc is at least substantially a DC voltage). When switches Q1 and Q2 are on, current flows through switch Q1 (between its source and drain) to windings L5, through windings L5 to switch Q2, and through switch Q2 (between its source and drain) to ground.

The forward converter of FIG. 2 differs from the FIG. 1 circuit since it lacks the ripple steering circuitry of FIG. 1 (components $L_{ext}$, C1, C2, L4, and L6 of FIG. 1), and since it includes input filter 10' which differs from input filter 10 of FIG. 1. Transformer T2' of FIG. 2 (whose primary winding is L5 and whose secondary windings are L7 and L10) replaces transformer T2 of FIG. 1. In the FIG. 2 circuit, the components labeled identically to corresponding components of FIG. 1 (e.g., control circuit 16) are identical in both FIG. 1 and FIG. 2. Because the FIG. 2 circuit lacks ripple steering circuitry, the current and voltage at Node 1 of FIG. 2 are time varying and have large amplitude frequency components of frequency 1/T (and harmonics thereof having higher frequencies). For this reason, input filter 10' of FIG. 2 includes a large input capacitor (a capacitor having high capacitance) and an EMI filter (electromagnetic interference filter) to filter the time-varying rms current (at Node 1 of FIG. 2) including the large amplitude harmonics of the time-varying current. In contrast, input filter 10 of FIG. 1 functions to divert the time varying frequency components of the pulsed current to the windings L4 and L6 which produces a DC current with small, secondary, time varying frequency components at Node 1 of FIG. 1 (which have much smaller amplitude than those of the current at Node 1 of FIG. 2, due to the input-side ripple steering circuitry of FIG. 1), and thus need include only a small input capacitor (having smaller capacitance than the input capacitor in filter 10' of FIG. 2). Thus, filter 10 of FIG. 1 is less expensive to implement than filter 10' of FIG. 2. The ripple steering technique implemented by the FIG. 1 circuit reduces ripple current (at the switching frequency, 1/T, and its harmonics up to about 1 MHz) by up to 40 dB or more, thereby also allowing filter 10 to be implemented with substantially smaller size and reduced weight than filter 10'.

In typical implementations of each of the circuits of FIG. 1 and FIG. 2 (and also the circuit of FIG. 3, to be described below), the integrated circuit known as the LM2705 circuit (manufactured by National Semiconductor Corporation of Santa Clara, Calif.) can be employed to implement circuit 16. The LM2705 circuit includes circuitry equivalent to pulse width modulation circuit PWM, switches Q1 and Q2, transformer T1, and diodes D1 and D2, connected as shown in FIG. 1.

Figure 1A:
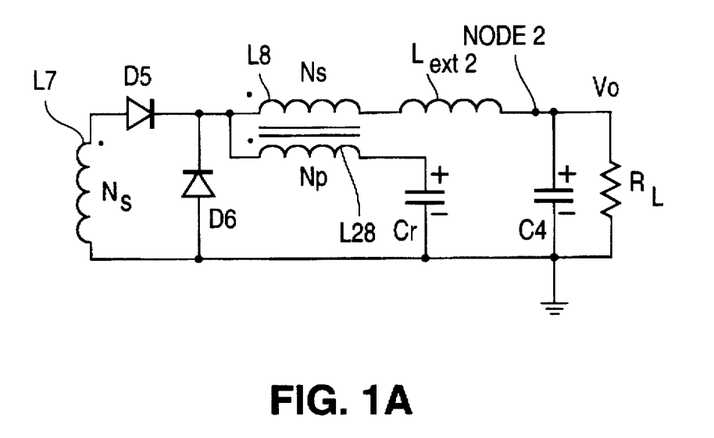
FIG. 1A is a schematic diagram of the output portion of an alternative embodiment of the FIG. 1 circuit (the FIG. 1A circuit is for replacing the output circuit portion of FIG. 1).

In an alternative embodiment of the inventive forward converter, the output circuit portion of FIG. 1 (comprising diodes D5 and D6, inductor L8, and capacitor C4, connected between the secondary winding L7 of transformer T2 and load $R_L$) is replaced by the circuit of FIG. 1A which implements ripple steering in the output section. The FIG. 1A circuit includes diodes D5 and D6, inductor L8, and capacitor C4, which correspond to the identically numbered components of FIG. 1. The FIG. 1A circuit also includes the following components (connected as shown in FIG. 1A) for implementing ripple steering: inductor L28 (which functions as a steering winding), capacitor Cr, and inductor $L_{ext2}$. Inductor L28 is wound around a common core with inductor L8, to form a transformer whose primary winding is inductor L28 and whose secondary winding is inductor L8. Inductor L28 is wound with the same polarity as L8, L8 has Ns turns, and L28 has Np turns (as indicated in FIG. 1A). Typically, Np is equal to Ns. Winding L7, diode D5, inductor L8, inductor $L_{ext2}$, and capacitor C4 are connected in series to ground as a low pass filter. Inductor L28 is connected in series with capacitor Cr, and the circuit branch consisting of elements L8, $L_{ext2}$, and C4 is connected in parallel with the branch consisting of L28 and Cr, as shown. During operation of this embodiment of the inventive forward converter (whose input side is the input side of FIG. 1 and whose output side is the FIG. 1A circuit), while the above-described operation of the input side induces a controllable voltage across winding L7, the output-side ripple steering components (L28, Cr, and $L_{ext2}$ of FIG. 1A) operate in a well known manner to reduce ripple current at Node 2. This embodiment thus employs ripple steering circuitry on the input side (to reduce ripple current at Node 1) and additional ripple steering circuitry on the output side (to reduce ripple current at Node 2).

In another variation on the FIG. 1 circuit, ripple steering circuitry (such as that described with reference to FIG. 1A) is employed on the output side (to reduce ripple current at Node 2) only; not also on the input side.

Figure 1B:
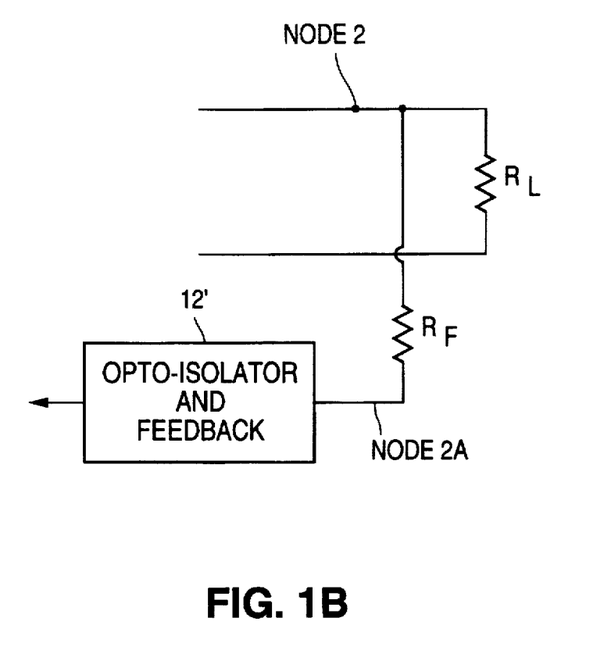
FIG. 1B is a schematic diagram of a portion of an alternative embodiment of the FIG. 1 circuit (which differs from a corresponding portion of FIG. 1 only by including an additional resistor $R_F$ and by including opto-coupler and feedback circuit 12' in place of opto-coupler and feedback circuit 12).

Another variation on the FIG. 1 circuit, which operates as a constant current source, will be described with reference to FIG. 1B. The FIG. 1B circuit differs from the FIG. 1 circuit in only two respects: it includes opto-coupler and feedback circuit 12' (in place of opto-coupler and feedback circuit 12); and it includes a resistor $R_F$ between Node 2 and opto-coupler and feedback circuit 12' (no such resistor is connected between Node 2 and opto-coupler and feedback circuit 12 in FIG. 1). The FIG. 1B circuit is a source of a controllable current which is drawn by load $R_L$. Opto-coupler and feedback circuit 12' draws a current (the current at Node 2A) which is indicative of the instantaneous output current drawn by the load, generates a feedback voltage signal indicative of this instantaneous output current, and supplies such feedback signal through an opto-coupler to pulse width modulation circuit PWM (for use by circuit PWM in generating a control voltage for controlling the duty cycle of switches Q1 and Q2). It should be understood that other embodiments of the invention are also current sources (e.g., current sources produced by modifying any of the voltage converters disclosed herein in the same manner that the FIG. 1 circuit is modified to produce the FIG. 1B circuit). For example, one embodiment of the invention is a current source identical to the FIG. 3 circuit (described below) as modified to include the circuitry shown in FIG. 1B (in place of circuit 12 of FIG. 3, and the line between Node 2 and circuit 12 of FIG. 3).

FIG. 3 is a schematic diagram of a flyback converter according to another embodiment of the invention. The function of the flyback converter of FIG. 3 is to convert input voltage Vdc to output voltage Vo. The output voltage Vo is typically applied across a load which is represented by load resistance $R_L$. The ratio of output voltage Vo to input voltage Vdc is controllable by varying the duty cycle of switches Q1 and Q2 within control circuit 16. Switches Q1 and Q2 are controlled so that both always have the same state ("on" or "off"). A flyback converter is a well known type of voltage conversion circuit, and since its structure and function are well known, they need not be described in detail herein. The following description will focus on the inventive improvements to conventional flyback conversion circuit design.

In a conventional flyback converter (without ripple steering circuitry), large pulsating currents appear both on the input as well as the output, causing essentially the same problem on the input side as described above with reference to the forward converter of FIG. 2. The output pulsed current requires large, bulky capacitors to handle the rms currents and a high frequency filter to minimize the ripple to an acceptable level. A solution to the problem of pulsating input (or output) current in a flyback converter is to include ripple steering windings on the input side (or the output side), allowing the pulsed currents to remain internal to the converter and causing substantially DC currents to appear on the input (or output) of the converter. It is known to apply the ripple steering technique to the input side of a flyback converter, to reduce time varying components of the input current (which have the switching frequency or harmonics thereof up to about 1 MHz) by up to 40 dB, thereby reducing the size and weight of the EMI filter required on the input side if the circuit is to meet UL and/or Mil (Military) specifications.

The FIG. 3 circuit includes input filter 10, control circuit 16, transformer T2 (whose primary windings are L4, L5, and L6 and whose secondary windings are L17 and L10), inductor $L_{ext}$ and capacitors C1 and C2 (connected in series with filter 10 and windings L4, L5, and L6 as shown), auxiliary voltage source 14 (for supplying voltage $V_{ax}$ needed for operation of pulse width modulation circuit PWM within control circuit 16), an output circuit comprising diode D5, inductor $L_{ext2}$ and capacitor C5 (connected as shown), capacitor C4 (connected between the secondary winding of transformer T2 and load $R_L$ as shown), and opto-coupler and feedback circuit 12 (for supplying a feedback signal indicative of the instantaneous output voltage Vo to pulse width modulation circuit PWM, for use in generating a control voltage for controlling the duty cycle of switches Q1 and Q2).

The duty cycle determines the relation between the output voltage Vo asserted by the FIG. 3 circuit and the input voltage Vdc to the FIG. 3 circuit:

$$Vo=[D/(1-D)](Ns/Np)(Vg)$$

where D is the duty cycle (To/T) of switches Q1 and Q2, T is the switching period (defined above with reference to FIG. 1), To is the "on" portion of each period T (during which switches Q1 and Q2 are on), and Vg is the voltage at Node 1. During normal operation, period T is fixed but time To varies (in response to the feedback voltage supplied to circuit PWM from circuit 12) to maintain output voltage Vo as nearly constant as possible.

The output side of the FIG. 3 circuit (which comprises diode D5, winding L19, and capacitors C4 and C5) differs from the output side of FIG. 1. Winding L19 (which functions as a steering winding) and capacitor C5 connected in series therewith (as shown in FIG. 3) implement ripple steering. Winding L19 is magnetically coupled to winding L17 (the secondary winding of transformer T2). Winding L19 is wound with the same polarity as L17, and each of L17 and L19 has Ns turns, as indicated in FIG. 3. At Node 4 (at one end of transformer T2), winding L17 is electrically connected to winding L19. Winding L17, diode D5, inductor $L_{ext2}$, and capacitor C4 are connected in series with ground as a low pass filter, and the branch consisting of winding L19 and capacitor C5 is connected in series with diode D5. During operation of the FIG. 3 embodiment of the inventive flyback converter, the ripple steering circuit (components L19 and C5 connected as shown) operate in a well known manner to reduce ripple current at Node 2, so that output voltage Vo is asserted (without any significant time-varying frequency component) across load $R_L$, in response to the voltage induced across winding L17 as a result of operation of the input side of the FIG. 3 circuit (as described above with reference to the input side of FIG. 1).

Opto-coupler and feedback circuit 12 of FIG. 3 functions in the same manner as circuit 12 of FIG. 1, and the control voltage generation circuitry within circuit PWM of FIG. 3 functions in the same manner as the control voltage generation circuitry within circuit PWM of FIG. 1. Circuit PWM thus determines the duty cycle of switches Q1 and Q2 (within control circuit 16) in response to the feedback voltage received from circuit 12.

As in the foregoing description of FIG. 1, we denote the voltage at Node 1 as "$V_g$" in the description of FIG. 3.

The input side of the FIG. 3 circuit includes the following components which implement ripple steering: inductor $L_{ext}$, capacitors C1 and C2, and steering windings L4 and L6, connected as shown in FIG. 3. These components provide a path for ripple current when switches Q1,Q2 are off, thereby eliminating the pulsed current of the converter AC (time varying frequency components having period T, and higher frequency harmonics thereof). As a result voltage source $V_g$ at Node 1 sees substantially a DC current (minimizing the input filter 10 and enabling the circuit to meet the UL and Mil specifications if needed).

The flyback converter of FIG. 3 thus employs ripple steering circuitry on the input side (to eliminate pulsed current at Node 1) and additional ripple steering circuitry on the output side (to eliminate pulsed current at Node 2). In alternative embodiments of the inventive flyback converter (which are variations on the FIG. 3 circuit), ripple steering circuitry is employed only on the input side (to eliminate pulsed current at Node 1) but not on both the input side and the output side. All embodiments of the inventive flyback converter include dual switches (e.g., switches Q1 and Q2) and ripple steering circuitry on the input side.

Although the FIG. 3 circuit could be redesigned with a single transistor switch which replaces transistor pair Q1 and Q2, such a single transistor would need to have a capacity to operate with a much higher voltage across it (e.g., across its source and drain) than the voltage over which transistor Q1 (or Q2) must operate. Specifically, where $V_g$ is the voltage at Node 1, each of transistors Q1 and Q2 must operate with a voltage in the range from zero volts to about $[V_g+(Np/Ns)Vo)]/2$ across its source and drain, while a single transistor which replaces pair Q1,Q2 would need to operate with a voltage in the wider range from zero to about $V_g+(Np/Ns)Vo)$ across its source and drain. As noted above, it is typically less expensive to implement a voltage converter with two low capacity switches (such as Q1 and Q2) than with a single switch having twice the capacity of either low capacity switch. Also, Q1 and Q2 will be able to deliver more power to the output.

FIG. 4 is a schematic diagram of a full bridge forward converter (push-pull converter) according to a third embodiment of the invention. The function of the full bridge converter of FIG. 4 is to convert input voltage Vdc to output voltage Vo. The output voltage Vo is typically applied across a load which is represented by load resistance $R_L$. The ratio of output voltage Vo to input voltage Vdc is controllable by varying the duty cycle of switch pair Q3, Q6 (or switch pair Q4, Q5). Switches Q3 and Q6 are controlled so that both always have the same state ("on" or "off"), and switches Q4 and Q5 are controlled so that both always have the same state ("on" or "off"). Both switch pairs are never on at the same time. When both switch pairs are off, no power is transferred from the input to the output. A full bridge forward converter is a well known type of voltage conversion circuit, and since its structure and function are well known, they need not be described in detail herein. The following description will focus on the inventive improvements to conventional full bridge forward converter design.

Although it is known to design a full bridge forward converter to implement ripple steering (on either or both the input side and the output side), such conventional full bridge forward converters have been designed with only two switches, which are controlled to operate in the following periodic sequence: the first switch is closed (while the second switch is open), then both switches are open, then the second switch is closed (while the first switch is open, and finally both switches are open. Typically, each of the two switches of such a conventional converter is implemented by a single transistor. Each of the two switches of such a conventional converter would need to have capacity to operate with a much wider range of voltages across it (e.g., across its source and drain) than the voltage range over which any of the four transistors of FIG. 4 (Q3, Q4, Q5, and Q6) must operate (in order for the conversion circuit to produce substantially the same output voltage in response to the same input voltage) . Specifically, where $V_g$ is the voltage at Node 1 of FIG. 4, each of transistors Q3, Q4, Q5, and Q6 must operate with a voltage in the range from zero volts to about $V_g$ across its source and drain, while a single transistor which replaces pair Q3,Q6 (or pair Q4,Q5) would need to operate with a voltage in the wider range from zero to about $2V_g$ across its source and drain. More power can be delivered to the output with four switches as opposed to only two switches (push-pull). Also, a push-pull (two switch) configuration is known to cause T2 to saturate unless provisions to prevent flux walking are implemented.

The FIG. 4 circuit includes input filter 10, pulse width modulation circuit PWM, capacitors C10 and C11, switches Q3, Q4, Q5, and Q6 (each of which is an NMOS transistor), transformer T1 (whose primary windings are L31 and L32, and whose secondary windings are L33, L34, L35, and L36, and transformer T2 (whose primary windings are L4, L5, and L6 and whose secondary windings are L27 and L28), connected as shown in FIG. 4. The input side of the FIG. 4 circuit also includes inductor $L_{ext}$ and capacitors C1 and C2 (connected in series with filter 10 and windings L4, L5, and L6 as shown), auxiliary voltage source 14 (for supplying voltage $V_{ax}$ needed for operation of pulse width modulation circuit PWM), and opto-coupler circuit 12 (for supplying a feedback signal indicative of the instantaneous output voltage Vo to pulse width modulation circuit PWM, for use in generating a control voltage for controlling the duty cycle of switches Q3, Q4, Q5, and Q6). The output side of the FIG. 4 circuit includes diodes D6 and D7, inductor L8, and capacitor C4, which provide voltage Vo across load $R_L$. Winding L27, diode D6, inductor L8, and capacitor C4 are connected to form a low pass filter. Winding L28, diode D7, inductor L8, and capacitor C4 are connected to form a low pass filter. Load $R_L$ and capacitor C4 are connected in parallel between Node 2 and ground.

Pulse width modulator PWM of FIG. 4 can be operated to assert (repeatedly) the following sequence of voltage combinations at its output t terminal "Q" (connected through capacitor C10 and inductor L31 to ground) and its output terminal "$\overline{Q}$" (connected through capacitor C11 and winding L32 to ground): +V ("high" voltage) at terminal Q and –V ("low" voltage) at terminal $\overline{Q}$, and then "high" voltage at terminal Q and "high" voltage at terminal $\overline{Q}$, and then "low" voltage at terminal Q and "high" voltage at terminal $\overline{Q}$, and then "low" voltage at terminal Q and "low" voltage at terminal $\overline{Q}$. In other words, PWM asserts "high" voltage at terminal Q and "low" voltage at terminal $\overline{Q}$ during a first phase of each cycle, "high" voltage at terminal Q and "high" voltage at terminal $\overline{Q}$ during a second phase of each cycle, "low" voltage at terminal Q and "high" voltage at terminal $\overline{Q}$ during a third phase of each cycle, and "low" voltage at terminal Q and "low" voltage at terminal $\overline{Q}$ during a fourth phase of each cycle. PWM asserts the first two voltage combinations (i.e., remains in the first two phases) for a period T, and then asserts the last two voltage combinations (i.e., remains in the last two phases) for the same period T (so that the entire four-phase cycle has period 2T). However, the transition between the first and second phase (of each cycle) is variable (in response to the output of circuit 12), and the transition between the third and fourth phase (of each cycle) is also variable (in response to the output of circuit 12).

It will be understood that the notation $\overline{Q}$ denotes a signal which is out of phase with a signal Q, and that terminal $\overline{Q}$ of circuit PWM outputs a signal which is out of phase with an otherwise identical signal output from terminal Q of circuit PWM.

NMOS transistors Q3, Q4, Q5, and Q6 are thus controlled by pulse width modulator PWM (and transformer T1) as follows: both Q3 and Q6 are "on" (with current flowing between the source and drain of each) and both Q4 and Q5 are "off" (with no significant current flow between the source and drain of each) during the first phase; all of Q3, Q4, Q5, and Q6 are "off" during the second phase; both Q4 and Q5 are "on" (with current flowing between the source and drain of each) and both Q3 and Q6 are "off" during the third phase; and all of Q3, Q4, Q5, and Q6 are "off" during the fourth phase. The duty cycle of transistor pair Q3,Q6 and the duty cycle of transistor pair Q4,Q5 (which are the same) determine the relation between the output voltage Vo asserted by the FIG. 4 circuit and the input voltage Vdc to the FIG. 4 circuit:

$$Vo=(Np/Ns)DV_g$$

where D is the duty cycle To/T of each switch pair (pair Q3,Q6 or pair Q4,Q5), where T is the above-defined period, To is the "on" portion of each period T during which only one pair (Q3,Q6 or Q4,Q5) but not both pairs of switches Q3, Q4, Q5, and Q6 is on, and $V_g$ is the voltage at Node 1 of FIG. 4.

The structure and function of auxiliary voltage source 14 of FIG. 4 is identical to the above-described function of auxiliary voltage source 14 of FIG. 1. The function of opto-coupler and feedback circuit 12 of FIG. 4 is identical to the above-described function of circuit 12 of FIG. 1, and control signal generation circuitry within circuit PWM of FIG. 4 functions in essentially the same manner as does the above-described control signal generation circuitry within circuit PWM of FIG. 1. The control voltage produced by the control signal generation circuitry within circuit PWM of FIG. 4 determines the transition time between the first and second phases of the cycle, and between the third and fourth phases of the cycle (and thus determines the duty cycle of switch pair Q3,Q6 and that of switch pair Q4,Q5).

We denote the voltage at Node 1 as voltage $V_g$, and thus the voltage across the primary windings of transformer T2 is $V_g$, and the voltage induced across the secondary windings of transformer T2 is $(Ns/Np)V_g$ when either pair Q3,Q6 or Q4,Q5 is on. With the input side of the FIG. 4 circuit operating in response to the described operating cycle of switch pairs Q3,Q6 and Q4,Q5, the voltage induced across the secondary windings (L27 and L28) of transformer T2 undergoes periodic polarity reversal. The output side of the FIG. 4 circuit (comprising diodes D6 and D7, inductor L8, and capacitor C4) functions to rectify and filter the square wave voltage which produces an average (i.e., DC) output voltage. When the polarity of the induced voltage is positive (the top end of inductor L27 is at a higher potential than the lower end of inductor L28 in FIG. 4), diode D7 prevents current flow inductor L8 to inductor L28, while current flows from inductor L27 through diode D6 to inductor L8 and capacitor C4 (keeping Node 2 at substantially constant voltage Vo). When the polarity of the induced voltage is negative, diode D6 prevents current flow inductor L8 to inductor L27, while current flows from inductor L28 through diode D7 to inductor L8 and capacitor C4 (keeping Node 2 at substantially constant voltage Vo). When all of switches Q3, Q4, Q5, and Q6 are off, diodes D6 and D7 will carry the output current via L8.

The ripple steering circuitry of the input side of FIG. 4 (components $L_{ext}$, C1, C2, L4, and L6 of FIG. 1) eliminate pulsed current (at the switching frequency and its harmonics) at Node 1, in the same manner as in the FIG. 1 circuit. In alternative embodiments of the inventive full bridge forward converter, the output side of FIG. 4 is modified to include ripple steering circuitry which functions to reduce ripple current at Node 2. Such alternative embodiments thus employ ripple steering circuitry on the input side (to eliminate pulsed current at Node 1) and additional ripple steering circuitry on the output side (to reduce ripple current at Node 2). In other variations on the inventive full bridge forward converter of FIG. 4, ripple steering circuitry is employed on the output side (to reduce ripple current at Node 2) only; not also on the input side.

Figure 5:
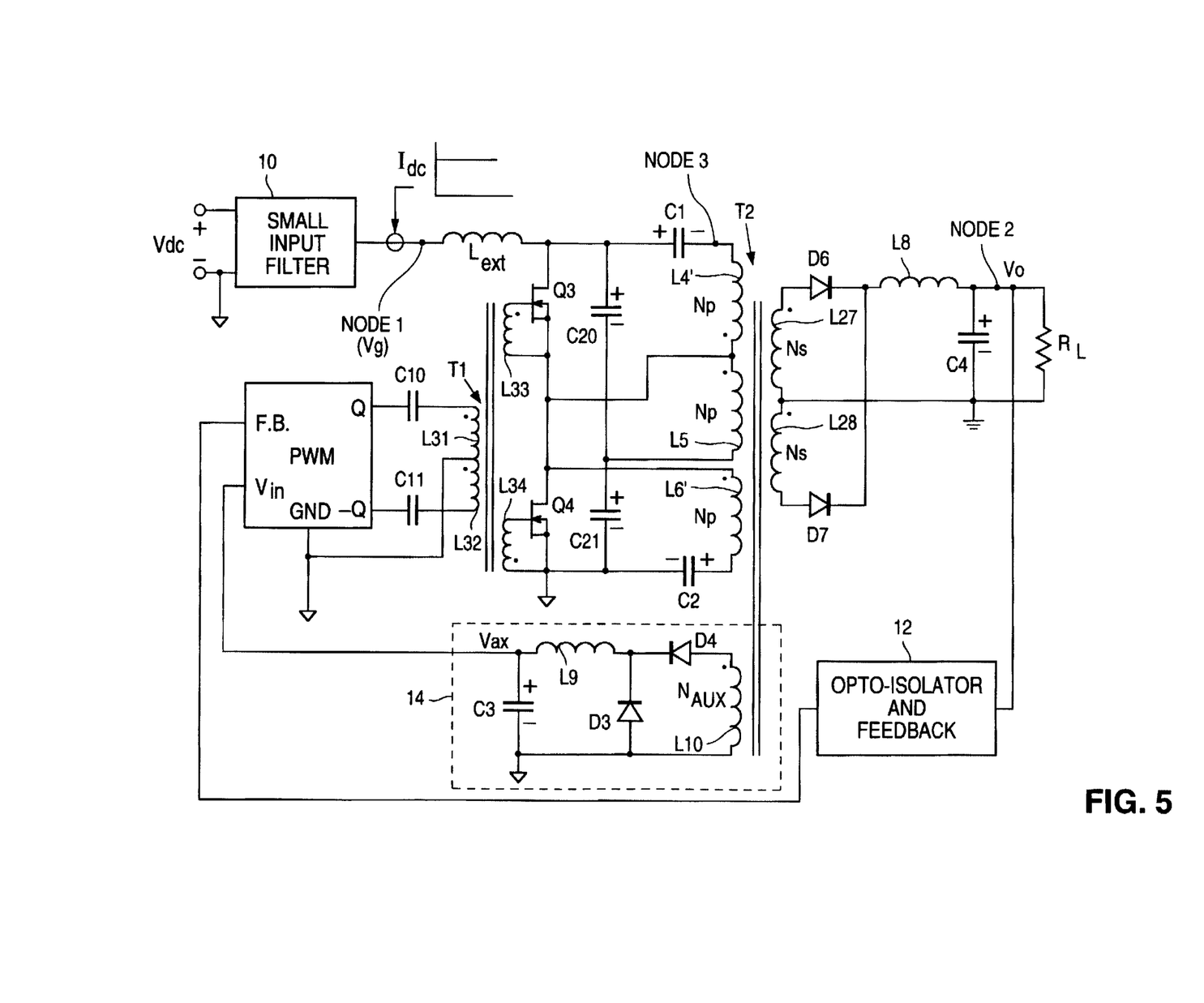
FIG. 5 is a schematic diagram of a half bridge forward converter according to a fourth embodiment of the invention.

FIG. 5 is a schematic diagram of a half bridge forward converter according to a fourth embodiment of the invention. The FIG. 5 circuit differs from that of FIG. 4 in that it includes capacitors C20 and C21 (connected as shown in FIG. 5) but does not include transistors Q5 and Q6 and secondary windings L35 and L36 (as does the FIG. 4 circuit), in that windings L4' and L6' in FIG. 5 have Np turns (unlike windings L4 and L6 in FIG. 4 which have Np/2 turns), and in that winding L6' in FIG. 5 is wound with polarity opposite to that of winding L6 of FIG. 4. Capacitor C20 is preferably identical to capacitor C21. The identically numbered components of FIGS. 4 and 5 are identical in structure and function in both circuits, and the description thereof (with reference to FIG. 4) will not be repeated with reference to FIG. 5.

The function of the half bridge converter of FIG. 5 is to convert input voltage Vdc to output voltage Vo. The output voltage Vo is typically applied across a load which is represented by load resistance $R_L$. The ratio of output voltage Vo to input voltage Vdc is controllable by varying the duty cycle of switch Q3 and that of switch Q4. A half bridge forward converter is a well known type of voltage conversion circuit, but the FIG. 5 circuit represents an improvement over the prior art in that it implements ripple steering (and does so in a particularly efficient manner).

In operation of the FIG. 5 circuit, circuit PWM controls switches Q3 and Q4 to repeatedly undergo the following four phase cycle: Q3 is "on" (with current flowing between its source and drain) and Q4 is "off" (with no significant current flow between its source and drain of each) during the first phase; both Q3 and Q4 are "off" during the second phase; Q4 is "on" and Q3 is "off" during the third phase; and both of Q3 and Q4 are "off" during the fourth phase. The system remains in the first two phases for a period T, and then remains in the last two phases for the same period T (so that the entire four-phase cycle has period 2T). However, the transition between the first and second phase (of each cycle) is variable (in response to the output of circuit 12), and the transition between the third and fourth phase (of each cycle) is also variable (in response to the output of circuit 12). The duty cycle of transistor Q3 and the duty cycle of transistor Q4 determine the relation between the output voltage Vo asserted by the FIG. 5 circuit and the input voltage Vdc to the FIG. 5 circuit:

$$Vo=1/2\ (Ns/Np)(D)(V_g)$$

where D=To/T for both pairs, and $V_g$ is the voltage at Node 1.

The voltage at Node 1 of FIG. 5 will be denoted as voltage $V_g$, and thus the voltage across the primary windings of transformer T2 of FIG. 5 is $V_g/2$ (since the voltage across capacitor C21 is $V_g/2$ when Q3 is on and Q4 is off, and the voltage across capacitor C20 is $V_g/2$ when Q3 is off and Q4 is on). Accordingly, the voltage induced across the secondary windings of transformer T2 in FIG. 5 is $(Ns/Np)V_g/2$. Thus, although the half bridge converter of FIG. 5 has the advantage (over the full bridge converter of FIG. 4) that it requires only half the number of transistors to implement than does the FIG. 4 circuit, the FIG. 5 circuit has the disadvantage that it develops only half the voltage across transformer T2 than does the FIG. 4 circuit (which reduces the magnitude of output voltage Vo which can be asserted in response to a given input voltage Vdc).

The ripple steering circuitry of the input side of FIG. 5 (components $L_{ext}$, C1, C2, L4, and L6 of FIG. 1) reduces ripple current (at the switching frequency and its harmonics) at Node 1, in the same manner as in the FIG. 1 circuit. In alternative embodiments of the inventive half bridge forward converter, the output side of FIG. 5 is modified to include ripple steering circuitry which functions to reduce ripple current at Node 2. Such alternative embodiments thus employ ripple steering circuitry on the input side (to reduce ripple current at Node 1) and additional ripple steering circuitry on the output side (to reduce ripple current at Node 2). In other variations on the inventive half bridge forward converter of FIG. 5, ripple steering circuitry is employed on the output side (to reduce ripple current at Node 2) only; not also on the input side.

Figure 6:
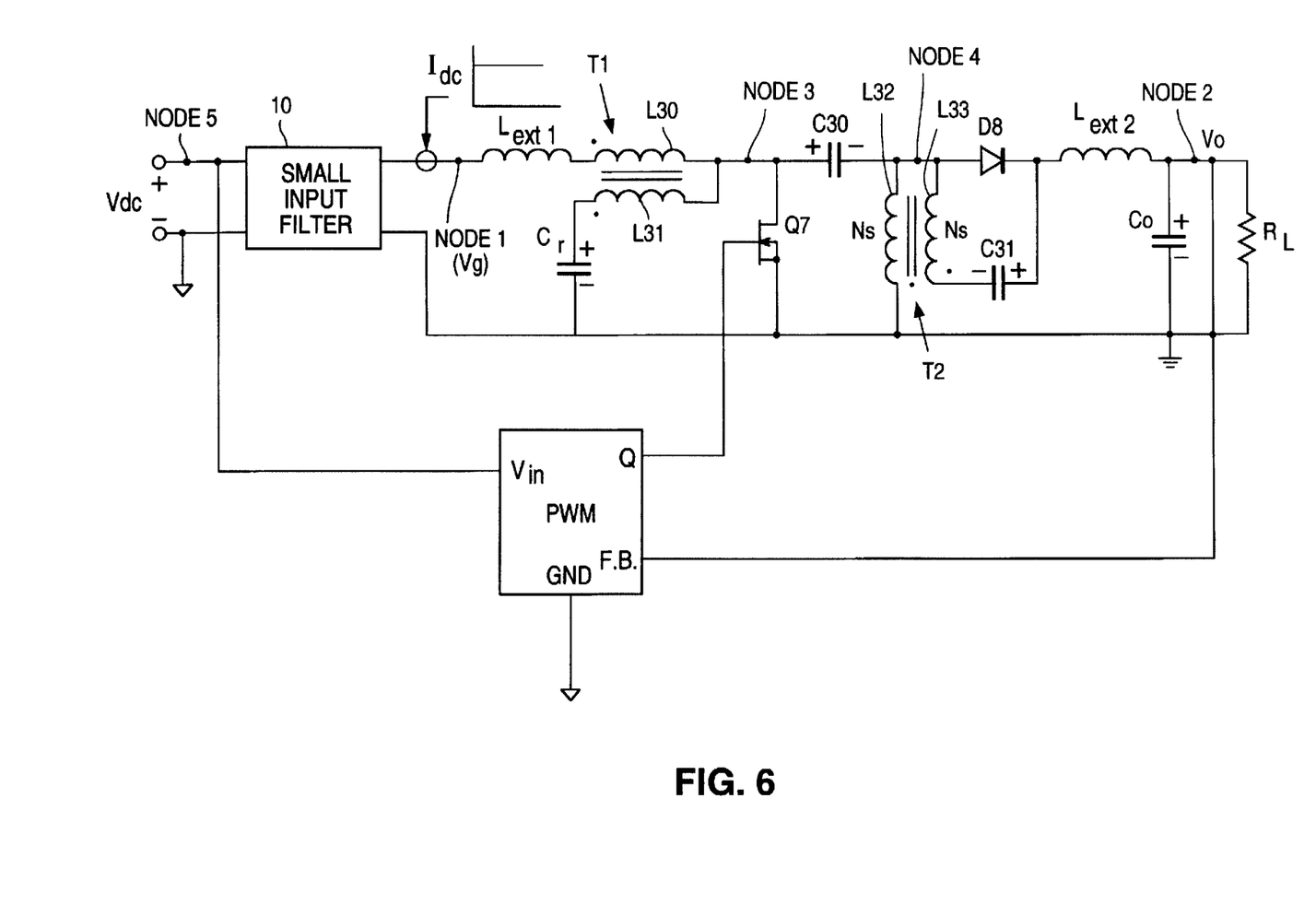
FIG. 6 is a schematic diagram of a SEPIC converter according to a fifth embodiment of the invention.

FIG. 6 is a schematic diagram of a SEPIC converter according to a fifth embodiment of the invention. The function of the SEPIC converter of FIG. 6 is to convert input voltage Vdc to output voltage Vo. The output voltage Vo is typically applied across a load which is represented by load resistance $R_L$. The ratio of output voltage Vo to input voltage Vdc is controllable by varying the duty cycle of switch Q7 (implemented as an NMOS transistor). A SEPIC converter is a well known type of voltage conversion circuit, but the FIG. 6 circuit represents an improvement over the prior art in that it implements ripple steering (and does so on both the input and output sides in a particularly efficient manner).

The FIG. 6 circuit comprises input filter 10 (which can have the same structure as input filter 10 of FIG. 1), which functions in the same way as does input filter 10 of FIG. 1. Input filter 10 can have simple design and be inexpensively implemented since the input-side ripple steering circuitry of FIG. 6 ensures substantially constant input current Idc at Node 1). The SEPIC converter of FIG. 6 also includes the following elements connected in series between Node 1 and ground: inductor $L_{ext1}$, inductor L30, capacitor C30, diode D8, inductor $L_{ext2}$, and load $R_L$. Inductor L31 is magnetically coupled to inductor L30 (typically with L30 and L31 wound around a common core) so that they form transformer T1. Inductor L30 is electrically coupled to inductor L31 at Node 3. Capacitor $C_r$ is connected in series with inductor L31, and the circuit branch comprising L31 and $C_r$ is connected to ground in parallel with the branch comprising C30, D8, $L_{ext2}$, and Co, the branch comprising transistor Q7, and the branch comprising winding L32. In transformer T1, primary winding L30 and secondary winding L31 are wound with the same polarity as shown.

Figure 7:
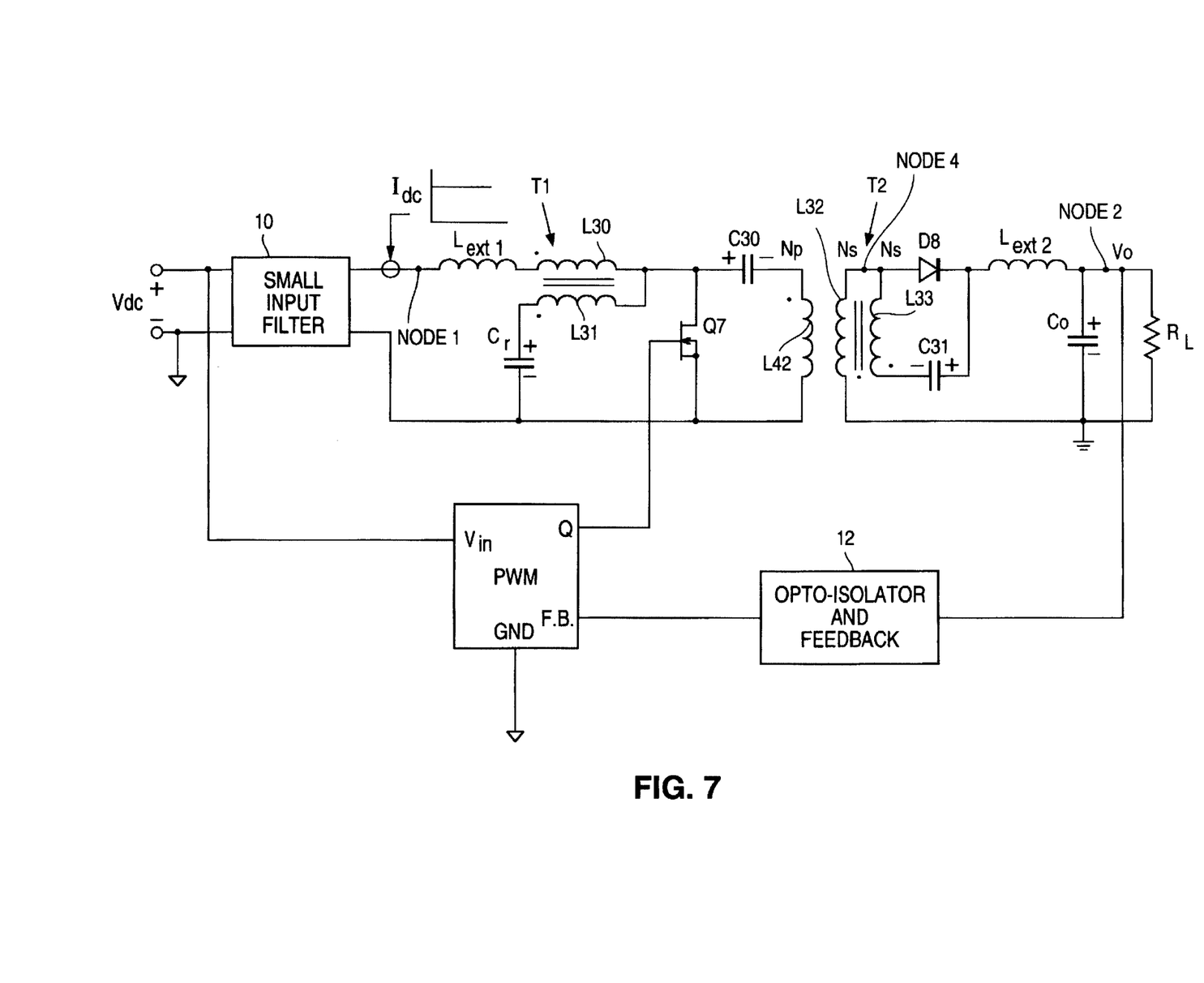
FIG. 7 is a schematic diagram of a variation on the SEPIC converter of FIG. 6, in which the input side is isolated from the output side.

In variations on the implementation shown in FIG. 7, inductors L30 and L32 are windings which are wound on the same core. In such variations, separate transformers T1 and T2 are replaced by a single transformer.

The source and drain of transistor Q7 are connected between Node 3 and ground, in parallel with the branch comprising L31 and $C_r$, and the gate of Q7 is controlled by circuit PWM (which can be identical to circuit PWM of FIG. 1).

Winding L32 is magnetically coupled with winding L33 but is not electrically isolated from winding L33 (typically L32 and L33 are wound around a common core), so that the windings form transformer T2. In transformer T2, the primary winding is L32 and the secondary winding is L33, windings L32 and L33 are wound with the same polarity as shown, and each of L32 and L33 has the same number of turns (Ns turns).

One end of winding L33 is connected in series with capacitor C31 and inductor $L_{ext2}$, and the other end of winding L33 is connected in series with diode D8 and inductor $L_{ext2}$ as shown. Elements L33 and C31, together with inductor $L_{ext2}$, implement ripple steering on the output side of FIG. 6 (to steer away ripple current from Node 2, and to cause output voltage Vo at Node 2 to be substantially constant in response to substantially constant voltage across the primary winding of transformer T2).

Capacitor Co is connected between Node 2 and ground in parallel with load $R_L$.

In response to substantially constant input voltage Vdc, output voltage Vo is substantially constant. In operation, circuit PWM periodically turns transistor switch Q7 off and on (with period T), by asserting a voltage at output terminal "Q" which cyclically has a high level and then a low level. Circuit PWM causes this voltage to undergo a transition of a first type (high-to-low or low-to-high) periodically (with period T), and to undergo a transition of the opposite type (low-to-high or high-to-low) at a controllable moment between consecutive transitions of the first type. Circuit PWM includes circuitry for controlling the latter level transitions in response to the instantaneous output voltage Vo (received at terminal "F.B." of circuit PWM). Circuit PWM implements negative feedback in the following sense: when output voltage Vo rises above its desired level, circuit PWM causes a reduction in the duty cycle of switch Q7 (thus reducing the output voltage); and when output voltage Vo falls below its desired level, circuit PWM causes an increase in the duty cycle of switch Q7. The supply voltage needed for operation of circuit PWM is provided by connecting Node 5 (at the input of FIG. 6) to terminal "$V_{in}$" of circuit PWM as shown.

The duty cycle of switch Q7 determines the relation between the output voltage Vo asserted by the FIG. 6 circuit and the input voltage Vdc:

$$Vo=[D/(1-D)]V_g,$$

where D is the duty cycle (To/T) of switch Q7, T is the above-mentioned switching period, To is the portion of each period T during which switch Q7 is on, and $V_g$ is the voltage at Node 1.

On the input side of the FIG. 6 circuit, elements $L_{ext1}$, L31, and $C_r$ implement ripple steering, by effectively steering AC frequency components (having the switching frequency or harmonics thereof) of the current at Node 3 through the branch comprising L31 and $C_r$, thereby reducing AC frequency components of the current (and voltage) at Node 1 during operation. As a result, voltage $V_g$ at Node 1 is at least substantially a DC voltage (assuming Vdc is at least substantially a DC voltage).

On the output side of the FIG. 6 circuit, elements L33, C31, and $L_{ext2}$ implement ripple steering, by effectively steering the pulsed current with frequency components (having the switching frequency or harmonics thereof) of the current at Node 4 through the branch comprising L33 and C31, thereby reducing AC frequency components of output voltage Vo at Node 2 during operation. As a result, the output voltage Vo is at least substantially a DC voltage (assuming Vdc is at least substantially a DC voltage).

The inventor has recognized that if a SEPIC converter is to be implemented with ripple steering circuitry, it is necessary (at least for most useful applications) to include ripple steering circuitry on both the input and output sides of the converter. Until the FIG. 6 embodiment of the present invention (and the FIG. 7 embodiment discussed below), SEPIC converters had not been implemented with ripple steering circuitry on both the input and output sides. Nor had they been implemented with ripple steering circuitry of the type shown in FIG. 6 on the input and output sides. For example, one type of conventional SEPIC converter has the structure shown in FIG. 6 with the ripple steering circuitry deleted (i.e., with inductors $L_{ext1}$ and $L_{ext2}$ replaced by short circuits, and elements L31, $C_r$, L33, and C31 omitted and replaced by open circuits).

FIG. 7 is a schematic diagram of another embodiment of the invention, which is a variation on the SEPIC converter of FIG. 6 in which the input side is isolated from the output side. The identically numbered components of FIGS. 6 and 7 are identical in structure and function in both circuits and the description thereof (with reference to FIG. 6) will not be repeated with reference to FIG. 7. The FIG. 7 circuit differs from that of FIG. 6 in that FIG. 7 includes opto-coupler and feedback circuit 12 and isolated transformer T2.

Transformer T2 of FIG. 7 comprises primary winding L42 which is magnetically coupled to (and electrically isolated from) winding L32. Primary winding L42 (which has Np turns) is wound with opposite polarity to winding L32 (which has Ns turns). As in FIG. 6, winding L32 is magnetically coupled with winding L33 (typically with L32 and L33 being wound around a common core). Winding L33, capacitor C31, and inductor $L_{ext2}$ implement ripple steering in the same way that they do in FIG. 6.

Circuit PWM of FIG. 7 is electrically isolated from Node 2 (by opto-coupler and feedback circuit 12); unlike circuit PWM of FIG. 6 whose terminal "F.B." is electrically connected to Node 2. The feedback signal supplied from circuit 12 to circuit PWM in FIG. 7 is indicative of the instantaneous output voltage Vo, and is used by the control signal generation circuitry within circuit PWM to generate a control voltage for controlling the duty cycle of switch Q7 (in the same manner that the control signal generation circuitry within circuit PWM of FIG. 6 generates such a control voltage).

The duty cycle of switch Q7 of FIG. 7 determines the relation between the output voltage Vo asserted by the FIG. 7 circuit and the input voltage Vdc:

$$Vo=[D/(1-D)](Ns/Np) V_g,$$

where D is the duty cycle (To/T) of switch Q7, T is the above-mentioned switching period, To is the portion of each period T during which switch Q7 is on, and $V_g$ is the voltage at Node 1.

The FIG. 7 embodiment employs input-side ripple steering circuitry (elements $L_{ext1}$, L31, and $C_r$) and output-side ripple steering circuitry (elements $L_{ext2}$, L33, and C31) having the same structure as the corresponding circuitry in FIG. 6. In contrast, one type of conventional isolated SEPIC converter has the structure shown in FIG. 7 with the ripple steering circuitry deleted (i.e., with inductors $L_{ext1}$ and $L_{ext2}$ replaced by short circuits, and elements L31, $C_r$, L33, and C31 omitted and replaced by open circuits).

Preferred embodiments of the invention have been described with reference to FIGS. 1, 1A, and 3-7. Although these embodiments have been described in some detail, it is contemplated that many changes from (and variations on) these embodiments can be made without departing from the spirit and scope of the invention as defined by the appended claims.

What is claimed is:

1. A controllable voltage converter for asserting a controllable output voltage in response to an input voltage, said converter including:

at least one yoked switch pair, having a duty cycle which determines the output voltage;

control circuitry coupled to the switch pair, and configured to control the duty cycle, and thereby to control the output voltage; and ripple steering circuitry coupled to the switch pair, said ripple steering circuitry including at least two inductors coupled so as to steer ripple current and thereby maintain at least one of substantially DC input current and substantially DC output current with no more than small, secondary, time varying frequency components.

2. The controllable voltage converter of claim 1, also including:

a transformer having a primary side and a secondary side;

an input side which drives the primary side of the transformer; and an output side which is driven by the secondary side of the transformer, the output side having an output node at which the output voltage is asserted, wherein the ripple steering circuitry includes circuitry implemented on the output side and the at least two inductors are coupled to steer ripple current on the output side such that the ripple steering circuitry maintains substantially DC output current at the output node, with no more than small, secondary, time varying frequency components.

3. The controllable voltage converter of claim 1, also including:

a transformer having a primary side and a secondary side;

an input side which drives the primary side of the transformer, the input side having an input node coupled to receive the input voltage; and an output side which is driven by the secondary side of the transformer, wherein the ripple steering circuitry includes input-side ripple steering circuitry implemented on the input side and the at least two inductors are coupled to steer ripple current on the input side such that the ripple steering circuitry maintains substantially DC input current at said input node, with no more than small, secondary, time varying frequency components.

4. The controllable voltage converter of claim 3, wherein the ripple steering circuitry also includes output-side ripple steering circuitry implemented on the output side.

5. The controllable voltage converter of claim 3, wherein said at least one yoked switch pair is a pair of transistors connected on the input side such that current flows through one of the transistors to the primary side of the transformer and then through the other of the transistors when both the transistors are on, and wherein the input-side ripple steering circuitry provides a path for current flow through the input side when both the transistors are off.

6. The controllable voltage converter of claim 1, wherein said voltage converter is a forward converter including:
   a transformer having a primary side and a secondary side;
   an input side which drives the primary side of the transformer; and
   an output side which is driven by the secondary side of the transformer.

7. The controllable voltage converter of claim 6, wherein the ripple steering circuitry is implemented on the output side.

8. The controllable voltage converter of claim 6, wherein the input side has an input node coupled to receive the input voltage, and the ripple steering circuitry includes input-side ripple steering circuitry implemented on the input side, said input-side ripple steering circuitry including at least two inductors coupled to steer ripple current on the input side such that the ripple steering circuitry maintains substantially DC input current at said input node, with no more than small, secondary, time varying frequency components.

9. The controllable voltage converter of claim 8, wherein the ripple steering circuitry also includes output-side ripple steering circuitry implemented on the output side.

10. The controllable voltage converter of claim 1, wherein said voltage converter is a full bridge forward converter including:
    a transformer having a primary side and a secondary side;
    an input side which drives the primary side of the transformer; and
    an output side which is driven by the secondary side of the transformer.

11. The controllable voltage converter of claim 10, wherein the input side has an input node coupled to receive the input voltage, and the ripple steering circuitry includes input-side ripple steering circuitry implemented on the input side, said input-side ripple steering circuitry including at least two inductors coupled to steer ripple current on the input side such that the ripple steering circuitry maintains substantially DC input current at said input node, with no more than small, secondary, time varying frequency components.

12. The controllable voltage converter of claim 11, including a first yoked switch pair comprising a first transistor and a second transistor, and a second yoked switch pair comprising a third transistor and a fourth transistor, wherein the first yoked switch pair is connected on the input side such that current flows through the first transistor to the primary side of the transformer and then through the second transistor when the control circuitry causes both the first transistor and the second transistor to be on, the second yoked switch pair is connected on the input side such that current flows through the third transistor to the primary side of the transformer and then through the fourth transistor when the control circuitry causes both the third transistor and the fourth transistor to be on, and the input-side ripple steering circuitry provides a path for current flow through the input side when the control circuitry causes all of the first transistor, the second transistor, the third transistor, and the fourth transistor to be off.

13. The controllable voltage converter of claim 1, wherein said voltage converter is a flyback converter including:
    a transformer having a primary side and a secondary side;
    an input side which drives the primary side of the transformer; and
    an output side which is driven by the secondary side of the transformer.

14. The controllable voltage converter of claim 13, wherein the input side has an input node coupled to receive the input voltage, and the ripple steering circuitry includes input-side ripple steering circuitry implemented on the input side and the at least two inductors are coupled to steer ripple current on the input side such that the ripple steering circuitry maintains substantially DC input current at said input node, with no more than small, secondary, time varying frequency components.

15. A controllable half bridge forward voltage converter for asserting a controllable output voltage in response to an input voltage, said converter including:
    a transformer having a primary side and a secondary side;
    an input side which drives the primary side of the transformer, the input side having an input node coupled to receive the input voltage;
    an output side which is driven by the secondary side of the transformer;
    a first branch circuit on the input side, including a first switch, at least a first capacitor, and a primary winding of the transformer, said first switch having a first duty cycle;
    a second branch circuit on the input side, including a second switch, at least a second capacitor, and the primary winding of the transformer, said second switch having a second duty cycle, wherein the first duty cycle and the second duty cycle determine the output voltage;
    control circuitry coupled to the first switch and to the second switch, and configured to control the first duty cycle and the second duty cycle, and thereby to control the output voltage; and
    ripple steering circuitry on the input side, wherein the ripple steering circuitry is coupled to the first switch and the second switch, and the ripple steering circuitry includes at least two inductors coupled to steer ripple current on the input side such that the ripple steering circuitry maintains substantially DC input current at said input node, with no more than small, secondary, time varying frequency components.

16. The voltage converter of claim 15, wherein the control circuitry is configured to control the first switch and the second switch so that they cyclically enter a four-phase sequence including a first phase in which the first switch is closed and the second switch is open, a second phase in which the first switch and the second switch are open, a third phase in which the first switch is open and the second switch is closed, and a fourth phase in which the first switch and the second switch are open, and wherein current flows through the first branch but not the second branch during the first phase, current flows through the second branch but not the first branch during the third phase, and the ripple steering circuitry provides a path for current flow during the second phase and the fourth phase.

17. The voltage converter of claim 16, wherein each of the first switch and the second switch is a transistor.

18. The voltage converter of claim 15, wherein said output voltage is asserted at a first node on the output side, wherein the control circuitry is coupled to the first node, and wherein the control circuitry is configured to generate a control voltage in response to a feedback signal indicative of instantaneous amplitude of the output voltage and to control at least one of the first duty cycle and the second duty cycle in response to said control voltage.

19. A controllable SEPIC voltage converter for asserting a controllable output voltage in response to an input voltage, said converter including:

a transformer having a primary side and a secondary side;

an input side which drives the primary side of the transformer, the input side having an input node coupled to receive the input voltage;

an output side which is driven by the secondary side of the transformer, the output side having a first node at which the output voltage is asserted;

a switch on the input side, said switch having a duty cycle which determines the output voltage;

control circuitry coupled to the switch, and configured to control the duty cycle, and thereby to control the output voltage;

ripple steering circuitry on the input side, the ripple steering circuitry including at least a first inductor and a second inductor coupled to steer ripple current on the input side such that the ripple steering circuitry maintains substantially DC input current at said input node, with no more than small, secondary, time varying frequency components; and additional ripple steering circuitry on the output side, the additional ripple steering circuitry including at least a third inductor and a fourth inductor coupled to steer ripple current on the output side such that the additional ripple steering circuitry maintains substantially DC output current at the first node, with no more than small, secondary, time varying frequency components.

20. The voltage converter of claim 19, wherein the switch is a transistor.

21. The voltage converter of claim 19, wherein the input side is electrically isolated from the output side.

22. The voltage converter of claim 19, wherein the control circuitry is coupled to the first node, and wherein the control circuitry is configured to generate a control voltage in response to a feedback signal indicative of instantaneous amplitude of the output voltage and to control the duty cycle in response to said control voltage.

23. The voltage converter of claim 22, wherein the input side is electrically isolated from the output side, and also including an opto-coupler circuit which couples the control circuitry to the first node.

24. A controllable current source for asserting a controllable output current in response to an input voltage while drawing an input current, said current source including:

at least one yoked switch pair, having a duty cycle which determines the output current;

control circuitry coupled to the switch pair, and configured to control the duty cycle, and thereby to control the output current; and ripple steering circuitry coupled to the switch pair, said ripple steering circuitry including at least two inductors coupled so as to steer ripple current and thereby maintain at least one of the input current and the output current at a substantially constant level, with no more than small, secondary, time varying frequency components.

25. The controllable current source of claim 24, also including:

a transformer having a primary side and a secondary side;

an input side which drives the primary side of the transformer; and an output side which is driven by the secondary side of the transformer, the output side having an output node at which the output current is asserted, wherein the ripple steering circuitry includes circuitry implemented on the output side, and the ripple steering circuitry includes at least two inductors coupled to steer ripple current on the output side such that the additional ripple steering circuitry maintains the output current at a substantially constant level, with no more than small, secondary, time varying frequency components.

26. A controllable half bridge circuit for asserting a controllable output current in response to an input voltage, said circuit including:

a transformer having a primary side and a secondary side;

an input side which drives the primary side of the transformer, the input side having an input node at which an input current is received;

an output side which is driven by the secondary side of the transformer;

a first branch circuit on the input side, including a first switch, at least a first capacitor, and a primary winding of the transformer, said first switch having a first duty cycle;

a second branch circuit on the input side, including a second switch, at least a second capacitor, and the primary winding of the transformer, said second switch having a second duty cycle, wherein the first duty cycle and the second duty cycle determine the output current;

control circuitry coupled to the first switch and to the second switch, and configured to control the first duty cycle and the second duty cycle, and thereby to control the output current; and ripple steering circuitry on the input side, wherein the ripple steering circuitry is coupled to the first switch and the second switch, and the ripple steering circuitry includes at least two inductors coupled to steer ripple current on the input side such that the ripple steering circuitry maintains the input current at a substantially constant level, with no more than small, secondary, time varying frequency components.

27. A controllable SEPIC circuit for asserting a controllable output current in response to an input voltage, said circuit including:

a transformer having a primary side and a secondary side;

an input side which drives the primary side of the transformer, the input side having an input node at which the input voltage and an input current is received;

an output side which is driven by the secondary side of the transformer, the output side having an output node at which the output current is asserted;

a switch on the input side, said switch having a duty cycle which determines the output current;

control circuitry coupled to the switch, and configured to control the duty cycle, and thereby to control the output current;

ripple steering circuitry on the input side, the ripple steering circuitry including at least a first inductor and a second inductor coupled to steer ripple current on the input side such that the ripple steering circuitry maintains the input current at a substantially constant level, with no more than small, secondary, time varying frequency components; and additional ripple steering circuitry on the output side, the additional ripple steering circuitry including at least a third inductor and a fourth inductor coupled to steer ripple current on the output side such that the additional ripple steering circuitry maintains the output current at a substantially constant level, with no more than small, secondary, time varying frequency components.

* * * * *